(12) United States Patent
Hoppe et al.

(10) Patent No.: US 7,051,473 B2
(45) Date of Patent: May 30, 2006

(54) BAIT DEVICE

(76) Inventors: Klaus Hoppe, Waisenhausstrasse 37, Oberhausen 46117 (DE); Peter Oser-Veltins, Rusterweg 1, Oberhausen 46147 (DE)

( * ) Notice: Subject to any disclaimer, the term of this patent is extended or adjusted under 35 U.S.C. 154(b) by 389 days.

(21) Appl. No.: 10/169,496

(22) PCT Filed: Jan. 4, 2001

(86) PCT No.: PCT/DE01/00009

§ 371 (c)(1),
(2), (4) Date: Nov. 21, 2001

(87) PCT Pub. No.: WO01/49110

PCT Pub. Date: Jul. 12, 2001

(65) Prior Publication Data

US 2005/0102890 A1    May 19, 2005

(30) Foreign Application Priority Data

Jan. 7, 2000    (DE) ................................. 100 00 326

(51) Int. Cl.
*A01M 1/20*    (2006.01)
*A01M 25/00*    (2006.01)

(52) U.S. Cl. ........................................................ 43/131
(58) Field of Classification Search ................. 43/131, 43/124, 132.1
See application file for complete search history.

(56) References Cited

U.S. PATENT DOCUMENTS

| | | | | |
|---|---|---|---|---|
| 3,940,876 A | * | 3/1976 | Zaccaira | 43/131 |
| 4,630,392 A | | 12/1986 | Ferraro | 43/131 |
| 4,823,505 A | | 4/1989 | Jackson | 43/124 |
| 4,945,673 A | | 8/1990 | Lavelle | 43/124 |
| 5,832,658 A | | 11/1998 | Randon | 43/131 |
| 6,640,488 B1 | * | 11/2003 | Roberts | 43/109 |

FOREIGN PATENT DOCUMENTS

| | | | |
|---|---|---|---|
| DE | 3819956 A1 | * | 12/1989 |
| DE | 19612883 | | 3/1996 |
| EP | 0360960 | | 3/1989 |
| EP | 0664952 | | 7/1994 |
| GB | 0876761 | | 9/1997 |
| WO | WO 95/02959 | | 2/1995 |
| WO | WO 97/40667 | | 11/1997 |

* cited by examiner

*Primary Examiner*—Teri Pham Luu
*Assistant Examiner*—Kimberly S. Smith
(74) *Attorney, Agent, or Firm*—Collard & Roe, P.C.

(57) ABSTRACT

The present invention relates to a bait device for inserting into panelling, having a bait bushing which is closed at one end and has an outer collar at the closed bushing end, having a bait holder which is arranged in the bait bushing and is intended for edible bait, and having means for securing the bait bushing against falling out of the panelling, and also relates to the use of the same for the abovementioned purposes.

10 Claims, 3 Drawing Sheets

BAIT DEVICE

Figure 1:
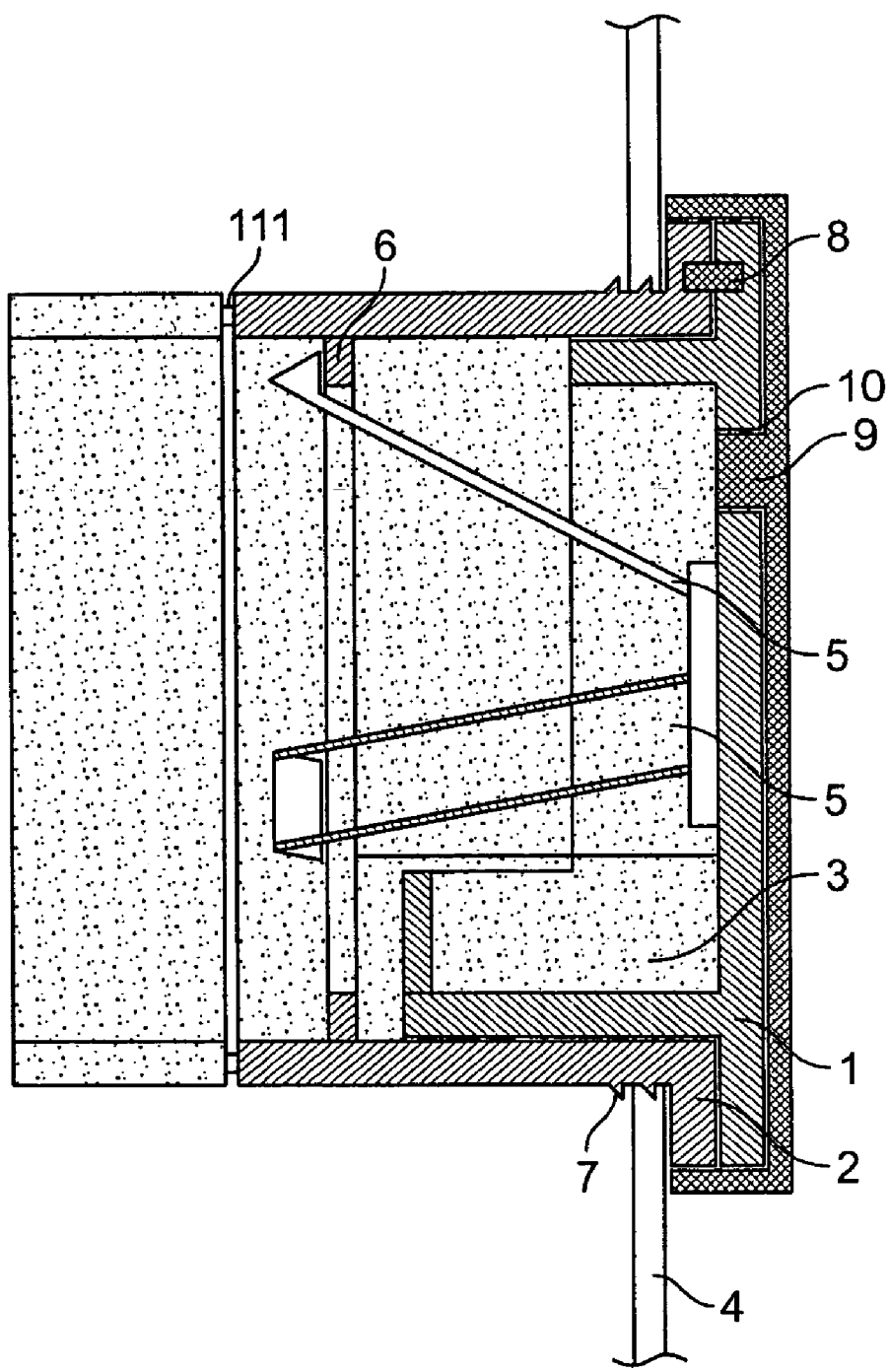

The present invention relates to a bait device and to the use of the same for controlling harmful insects and small mammals.

The prior art has disclosed a series of poisoned bait holders. Thus, for example, EP 360960 describes a poisoned bait holder with a bottom part and a covering part, the bottom part having a peripheral flat base, an inner ramp arrangement and a multiplicity of wall elements which are secured in a specific geometrical arrangement in relation to one another, the covering of the poisoned bait holder having a multiplicity of openings for the access of insects and the openings being arranged along radially oriented sides of the lobes.

DE 3819956 describes a further device for killing small mammal pests. The device described here has a spring-movable striking bow, a holder, a mechanism for locking and releasing the striking bow, and a receptacle for bait. In this case, the striking bow is locked, and also released again, by a lever which is provided with a hook, is fitted, at one end, in a movable manner, on the holder and, in the operating position, has its free end resting on an abutment of the device, said abutment being independent of the striking bow and being arranged within the holder.

EP 664952 describes a flat bait station for cockroaches comprising a top plate and a bottom plate and side walls which connect the top and the bottom plates to one another, the side walls having at least one small opening and at least one relatively large opening, with a container which is intended for poisonous bait and is fastened on the inside of a side wall. A specific configuration of differently sized openings allows the cockroach which is to be caught to move into the bait holder in a manner which is appropriate for the stage of growth of the cockroach.

The prior art does not disclose any solutions for insect bait stations or poisoned bait holders for poorly accessible regions in suspended ceilings, arrangements provided with protective walls or panellings, and switch cabinets, cable ducts, etc., which are easy to insert. In the prior art, it is necessary, for pest control, in these cases to remove the coverings or panellings or even the devices themselves and to take specific action against the insects using sprays or by laying out insect baits.

Such steps, however, are extremely time-consuming and require the operation of the installation to be interrupted at the respective point in time in order for the pest control to be carried out accordingly. As a result of the installation or the operations and operating arrangements being necessarily shut down, considerable shutdown costs are incurred. The same also applies to the private sector.

The prior art does not disclose any solutions to this problem. The object of the invention is thus to allow the facilitated control of pests such as insects and small mammals at poorly accessible locations, the removal of covering panels, screening or protective arrangements and panellings not being necessary.

This is achieved according to the invention by providing a bait device for inserting into a panelling or covering element, having a bait bushing with an open end oriented towards the interior of the panelling and a closed end oriented away from the interior of the panelling, having a bait holder which is arranged in the bait bushing and is intended for edible bait, and having means for securing the bait bushing against falling out of the panelling.

The present invention makes it possible to reduce the amount of work required and prevents damage to the panellings of the ceilings and floors as a result of removal and re-installation. Furthermore, the pests can be controlled in a specific manner, and health hazards as a result of possible contamination to the servicing staff are avoided.

In a simple form, the bait bushing is formed from a piece of tube which has a round, rectangular or square basic surface area and is closed on the outside by a covering plate. It is possible for a bait holder, for example a shallow dish, to be arranged in said bait bushing or for a hollow to be provided in the bait bushing, edible bait being located in said hollow. The bait holder may also be mounted rotatably in a securing means of the bait bushing, with the result that the bait bushing can be plugged into horizontal or vertical panelling.

In the simplest form, the bait device according to the invention may be designed in the form of a dummy stopper for panellings or cable ducts, into which a quantity of edible bait adequate for the pests is introduced and which is then plugged or screwed into a bore in the panelling. The present invention is thus also aimed at the use of such a dummy stopper, preferably having a cylindrical cross section and preferably provided with an external thread, as a bait device for the purpose of accommodating edible bait.

Providing the bait device according to the invention makes it possible for the latter, secured against falling out once inserted into the covering wall or the housing of the device, to provide the edible bait for the insects which are to be destroyer or the pests such as rodents, removal of the covering wall or of the sheet-metal panelling not being necessary. The edible bait may be an edible bait which does or does not contain poisonous substances for the peat which is to be destroyed. In the case of a non-poisonous edible bait, it is additionally possible to provide a mechanical trap for the pest which is to be destroyed. The mechanical trap may be a striking-bow trap or a trap for catching animals alive, for example in the form of a wire cage.

The bait bushing is preferably fastened in the region of infestation where the pests move about, in order to facilitate the access to the bait device. It is easily possible for the bait to be refilled or exchanged once the bait device has been withdrawn from the panelling, with the result that shutdown times are minimized or even avoided.

A viewing window with a window panel made of a transparent material, for example of glass or plexiglass, is preferably provided in the bait device according to the invention, in order for it to be possible to monitor the filling state of the bait device.

In a preferred embodiment, a removable closure cover is provided at the closed end of the bait bushing, said closure cover further preferably being provided with second securing means, preferably designed in the manner of a lock, for securing against unintended removal. In a particularly preferred embodiment, the closure cover is secured in a pivotable manner on the bait bushing via a hinge. A closure spring or a lock may be provided on that side of the closure cover which is located opposite the hinge, with the result that the cover can only be opened and pivoted once a suitable tool or key has been introduced.

Although, in the simplest case, the configuration of the bait device in the version, having a bait bushing, bait holder and means for securing the bait bushing against falling out of the panelling, is sufficient, it is advantageous to secure the bait bushing in an installation bushing, which preferably remains fixed in the covering or sheet-metal panelling.

In the case of this embodiment, first of all the installation bushing is pushed into the panelling and secured against falling out. In this case, the means of securing against falling out may be configured by corresponding protrusions and notches of the respective bait bushing and installation bushing, in which case the sheet-metal panelling or the covering does not require any particular comprehensive working. Depending on the wall thickness of the carrier material, i.e. for example the sheet-metal panelling, etc., the installation bushing may be adapted correspondingly in terms of the plug-in depth, the bait bushing, which accommodates the edible bait in a bait holder, being correspondingly plugged into the installation bushing from the outside.

In the simplest form, the means for securing against falling out may be designed in the form of clamping toothing formations on the installation bushing and/or the bait bushing, the toothing formations clamping the latter as the bait bushing or the installation bushing is introduced into the panelling and thus securing the same against falling out.

It is preferred, however, for the bait bushing and installation bushing to be provided with means for preventing them from falling out which allow the bait bushing to be introduced straightforwardly into the panelling or installation bushing and, at the same time, allow the bait bushing to be reliably secured in the panelling or installation bushing without it being possible for the bait bushing to be removed from the panelling or installation bushing by unauthorized individuals.

This is achieved in a preferred embodiment in that the securing means provided on the bait bushing are configured in the form of at least one retaining clamp, but preferably two or more retaining clamps, which can be introduced without obstruction when the bait bushing is introduced into the panelling or installation bushing, but then, by virtue of the bait bushing being rotated, the retaining clamps are brought into engagement with securing noses, or an inner part-collar, on the installation bushing and latch in.

In the preferred embodiment, the installation bushing and the bait bushing are each designed in the form of cylindrical bushings, preferably with radially outwardly projecting collars, the external diameter of the bait bushing being adapted to the internal diameter of the installation bushing. It is also the case that the collars of the bushings are preferably dimensioned in relation to one another such that the external diameters of the collars are equal.

In order to secure the bait bushing in the installation bushing, the retaining clamps provided on the inside of the bait bushing are brought into engagement with the securing noses in that the bait bushing is rotated in the installation bushing from an introduction position into a securing position. In this securing position or use position, the bait bushing is secured in the installation bushing against withdrawal.

The rotation of the bait bushing in the installation bushing takes place, in the simplest case, with the aid of a key or of a withdrawal device, these engaging in at least one correspondingly adapted opening in the bait bushing. The opening may serve, at the same time, as a viewing window, in order for it to be possible to observe the filling state of the bait dish. The openings for the withdrawal device and/or the window may be closed by means of a covering screen, with the result that the penetration of dust and spray water is ruled out. In order for it to be possible for the bait bushing according to the invention to be used not just in vertical carrier materials, such as sheet-metal panellings of machines, in kitchens, etc., but also in ceiling panellings, the use of a pivotable bait dish is preferred.

There are no particular restrictions on the material of the bait device according to the invention. For strength-related and weight-related reasons, the use of plastic or metal is preferred. The size of the bait device is not subject to any limitations either, and is only determined by the use purpose. It is thus possible for the bait device to comprise, for example, a bait bushing with a diameter of 20 cm or more, the rest of the components of the bait device being integrated therein. Such a size is necessary and expedient in particular when a mechanical trap is used.

Figure 2:
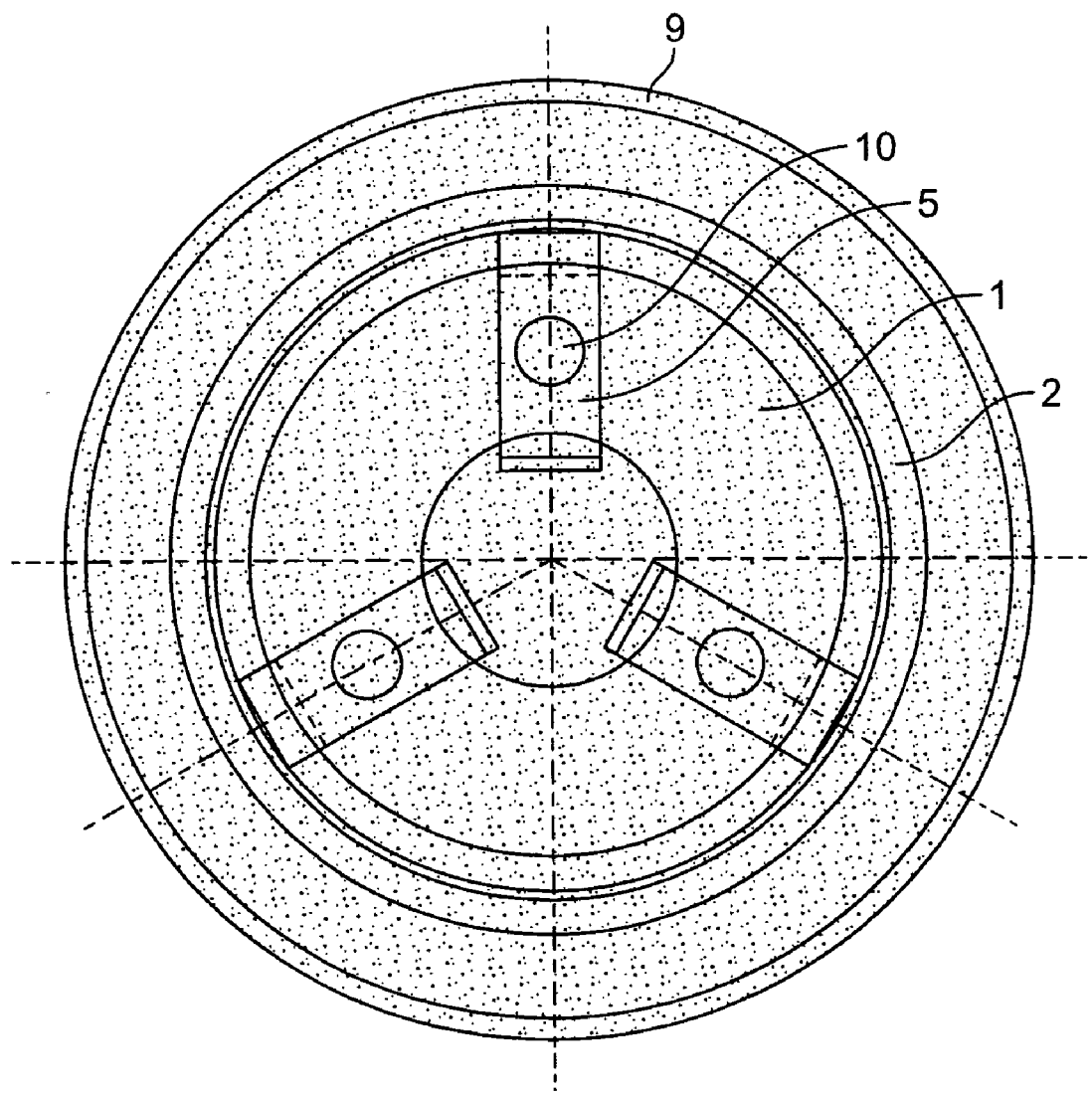
Figure 3:
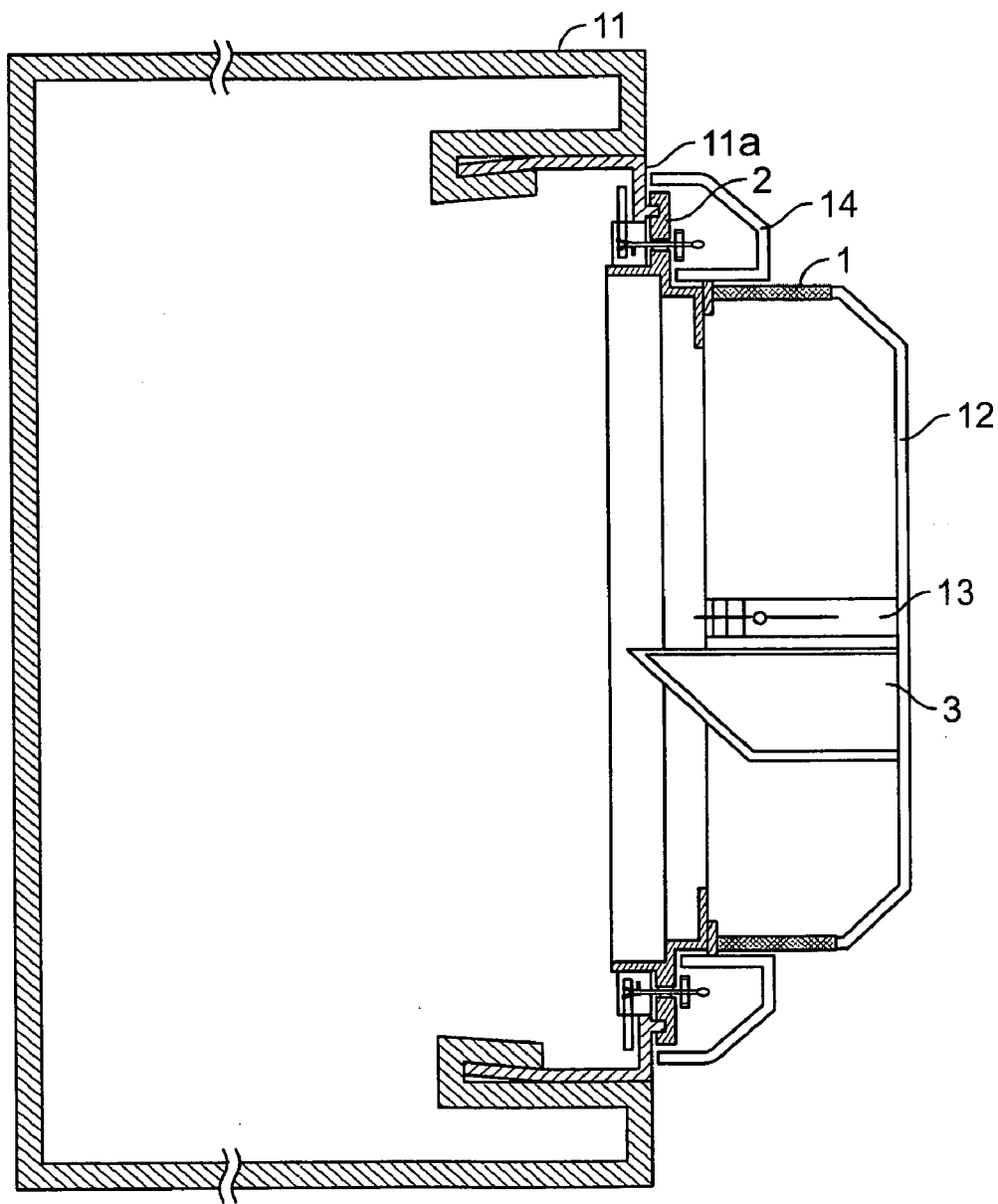

The present invention will be explained in more detail by way of the attached figures, FIGS. 1 to 3, in which FIG. 1 shows a longitudinal section through a configuration of the bait device according to the invention, FIG. 2 shows a plan view from the inside of the bait station according to the invention from FIG. 1, and FIG. 3 shows a further embodiment of the bait device according to the invention, this being intended for use, in particular, for installation into cable ducts or similar locations where the lack of interior space makes it difficult for the bait device to be pushed in.

As can be seen in FIG. 1, the bait device according to the invention comprises the bait bushing 1 with bait dish 3, which is pushed into the installation bushing 2 and is secured in the installation bushing 2 via the retaining clamps 5 which, in the installed state, engage with the noses 6. The installation bushing itself is secured, via the clamping toothing formation 7, in the carrier material 4, which may be a sheet-metal panelling, a covering panel or a suspended ceiling.

In the installed state, the bait bushing and installation bushing are additionally arrested in relation to one another via the arresting nose 8. The openings 10 for the withdrawal device and/or the key for rotating the bait bushing and installation bushing are closed via the covering plate 9.

Provided in the direction of the inner end of the installation bushing are predetermined breaking points 111, via which it is possible for the length of the installation bushing to be adapted to the installation conditions by virtue of the inner border region being broken off.

The plan view of FIG. 2 shows the bait bushing 1, with bait dish 3, plugged into the installation bushing 2 as well as the resilient clamp 5 engaging on the installation bushing. Engaging around the outside of the installation bushing 2 is the bushing collar which closes the gap between the installation bushing and bait bushing and belongs to the covering plate 9, which likewise closes the opening 10 for the withdrawal device, which is not illustrated in the figures.

As shown in FIG. 3 in the cross section of a further embodiment, which is suitable for installation in cable ducts in particular, the installation bushing 2 has been plugged into a cable duct 11 with cable-duct cover 11a. The bait bushing 1 is secured on the installation bushing 2 and, in turn, is closed on the outside by the closure cover 12. Arranged on the closure cover 12 is the securing lug 13, the bait dish 3 and the hinge (not illustrated in the drawing) for pivoting the closure cover 12. The transition between the installation bushing 2 and bait bushing 1 is concealed by the facing frame 14. The embodiment shown in FIG. 3 is used, in particular, for panellings and ducts where cables, structural elements, etc. make it difficult for the bait bushing or installation bushing to be pushed in further into the interior.

The invention claimed is:

1. A bait device comprising:
    a bait bushing having an open end that is oriented towards the an interior of a paneling and a closed end that is oriented away from the interior of the paneling;
    a bait holder coupled to the bait bushing and configured to receive edible bait;

an installation bushing that at least partially encloses the bait bushing;

a connector for securing the bait bushing to the paneling, thereby preventing the bait bushing from falling out of the paneling, wherein the connector is coupled to the bait bushing and comprises a clamp that is configured to be introduced into the paneling or installation bushing without obstruction when the bait bushing is introduced into the paneling or installation bushing; and wherein the connector is brought into latching engagement with a securing nose on the paneling or installation bushing when the bait bushing is rotated.

2. The bait device of claim 1 wherein the installation bushing comprises a collar at an end that is directed towards an outer end of the bait bushing.

3. The bait device of claim 1 wherein the bait bushing comprises a removable closure cover at the closed end.

4. The bait device of claim 3 wherein the closure cover further comprises a second connector that secures the closure cover.

5. The bait device of claim 1 wherein the bait bushing comprises a collar at an outer end.

6. The bait device of claim 1 wherein the closed end further includes an opening for introduction of a withdrawal device.

7. The bait device of claim 6 further comprising a cover element that closes the opening for introduction of the withdrawal device.

8. The bait device of claim 1 wherein the bait holder is rotatably coupled to the bait bushing.

9. A method of using a bait device, comprising:

providing a bait bushing having an open end and a closed end;

orienting the open end towards an interior of a paneling and orienting the closed end away from the interior of the paneling; coupling a bait holder to the bait bushing, wherein the bait holder is configured to receive edible bait;

providing an installation bushing that at least partially encloses the bait bushing; securing the bait bushing to the paneling using a connector, thereby preventing the bait bushing from falling out of the paneling, wherein the connector is coupled to the bait bushing and comprises a clamp that is configured to be introduced into the paneling or installation bushing without obstruction when the bait bushing is introduced into the paneling or installation bushing; and wherein the connector is brought into latching engagement with a securing nose on the paneling or installation bushing when the bait bushing is rotated.

10. The method of claim 9 wherein the bait device is configured in the shape of a dummy stopper having an external thread and a cylindrical cross section and wherein the bait device is coupled to a paneling or cable duct.

* * * * *

UNITED STATES PATENT AND TRADEMARK OFFICE
CERTIFICATE OF CORRECTION

| | | |
|---|---|---|
| PATENT NO. | : 7,051,473 B2 | Page 1 of 1 |
| APPLICATION NO. | : 10/169496 | |
| DATED | : May 30, 2006 | |
| INVENTOR(S) | : Hoppe, K et al. | |

It is certified that error appears in the above-identified patent and that said Letters Patent is hereby corrected as shown below:

In particular, in Column 4, line 64 (Line 3 of Claim 1), before the word "an" please delete the word: --the--.

Signed and Sealed this

Eighth Day of August, 2006

JON W. DUDAS
*Director of the United States Patent and Trademark Office*